Patented Mar. 27, 1923.

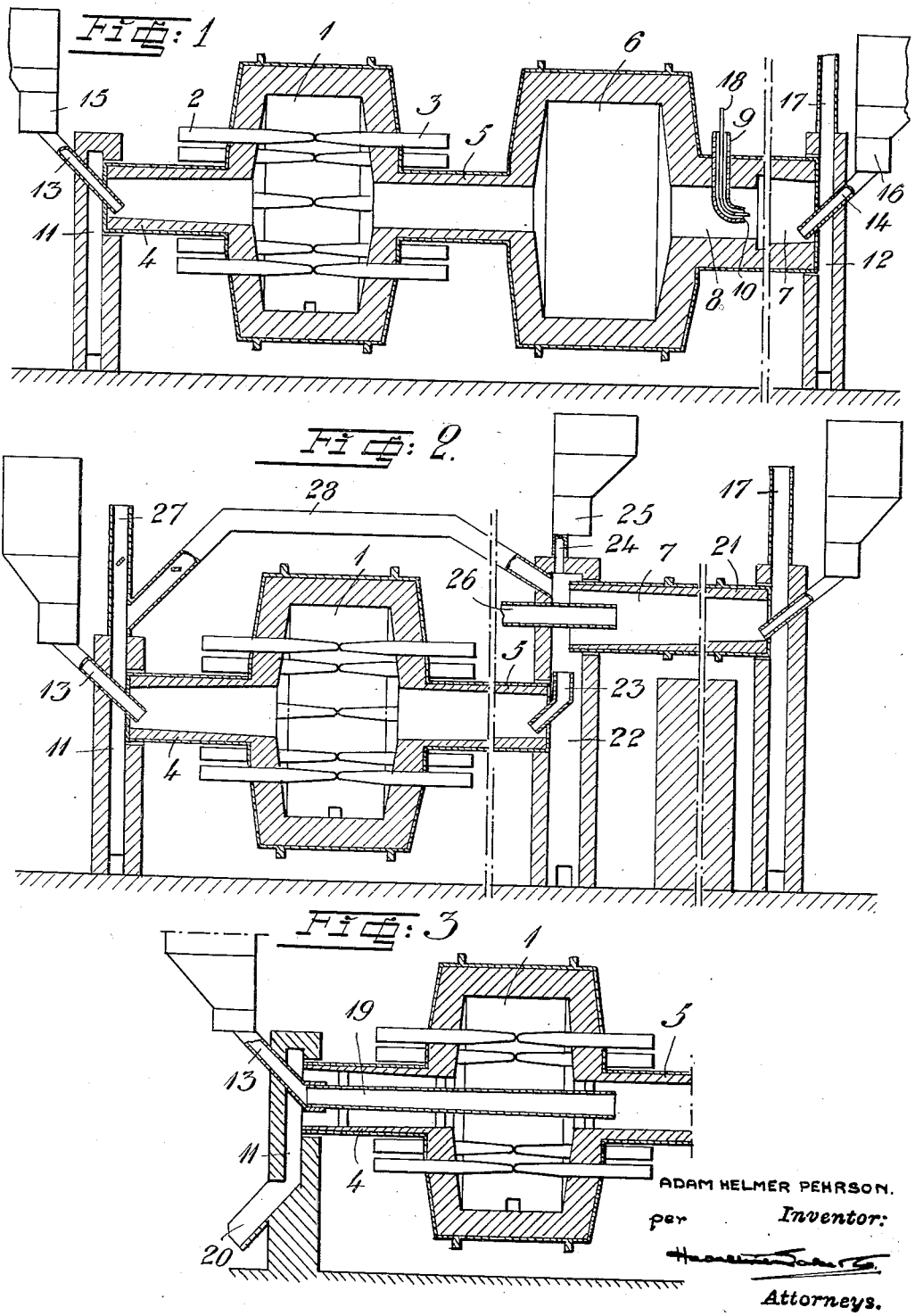

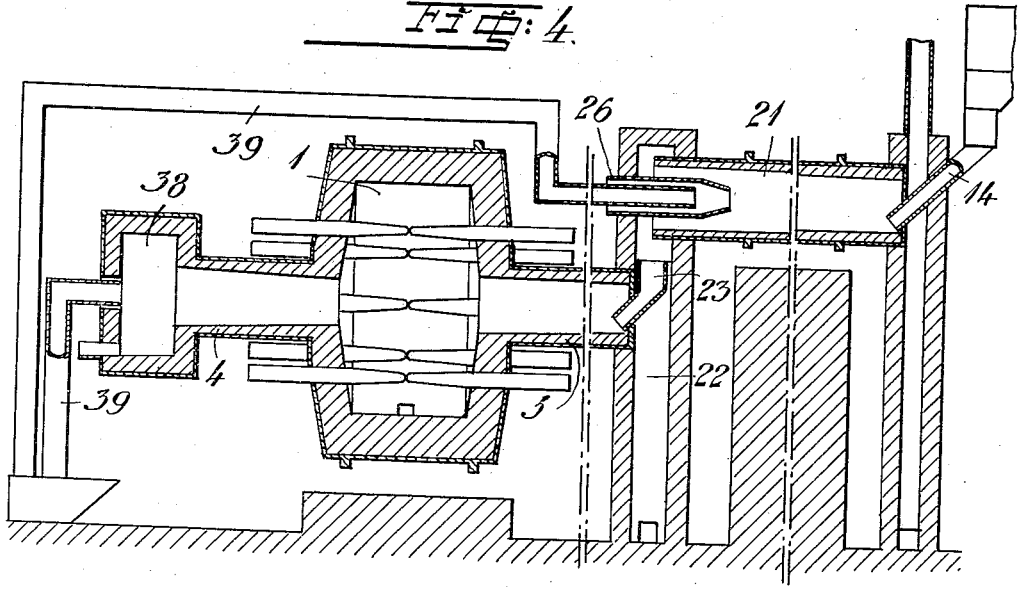
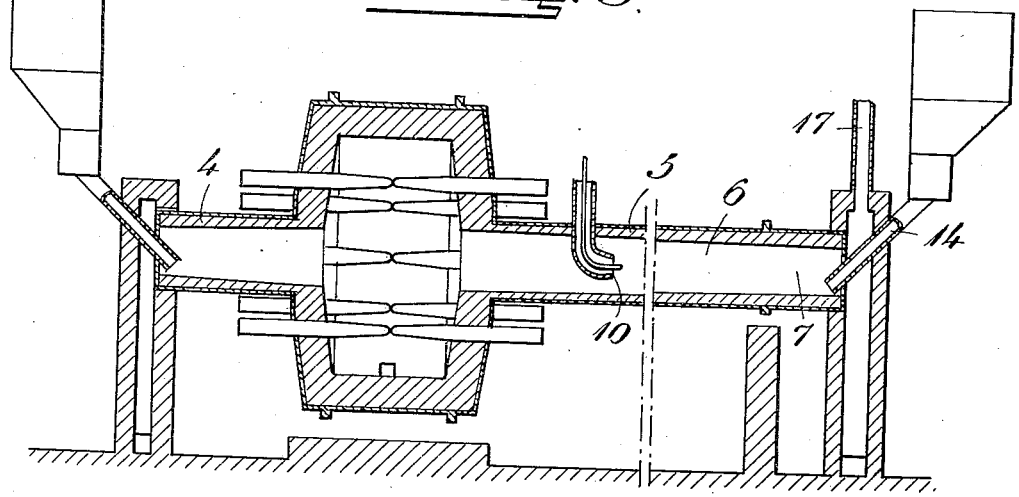

1,449,834

UNITED STATES PATENT OFFICE.

ADAM HELMER PEHRSON, OF STOCKHOLM, SWEDEN.

ROTATING OR OSCILLATING ELECTRIC-FURNACE PLANT.

Application filed April 11, 1922. Serial No. 551,682.

*To all whom it may concern:*

Be it known that I, ADAM HELMER PEHRSON, a subject of the King of Sweden, residing at Stockholm, Sweden, have invented certain new and useful Improvements in Rotating or Oscillating Electric-Furnace Plants, of which the following is a specification.

The rotating or oscillating electric furnaces now in use for metallurgical and similar processes have not been of such a construction that they permit to fully utilize the technical and economical advantages obtainable by rationally combining a preliminary heating and other treatment of the charge with the final reaction. Such a preliminary treatment of the charge, however, necessitates the use of drums or furnace chambers, combined in a suitable manner with the electric furnace, in which the final reaction takes place, and all or in part partaking in the rotating movement of the said furnace. Hereby a rotating or oscillating furnace system is formed in which the preliminary processes above mentioned can be carried out continuously and in a satisfactory manner especially as the heating effect of the monoxide of carbon formed during the process may be utilized by carrying out the preliminary reduction only by means of that gas and adding the carbon required in the final reaction first at a later stage of the furnace process. My invention relates to an electrically heated, rotating or oscillating combined furnace system or plant for carrying out processes of the kind stated and also other metallurgical processes.

This combined furnace system essentially consists of a rotating or oscillating electric furnace and of a suitable number of drums or furnace chambers arranged in series on that side of the electric furnace, from which the charge is introduced, the said drums or chambers communicating with the furnace and with one another. These drums or chambers (which may be arranged on the same axis as the electric furnace or not) preferably partake in the movement of the said furnace, although they may be stationary or have a movement independent of that of the electric furnace. Especially the pre-heating chamber may be stationary and shaped as a vertical shaft. The outermost or first drum or chamber communicates with a passage for the removal of the combustion products and also with a feeding apparatus for the charge. On the other side of the electric furnace according to the circumstances different apparatus as for the introduction of carbon or gas, condensers or cooling apparatuses and the like are placed.

The final reaction of the process takes place in the rotating or oscillating furnace, while a preliminary reduction or corresponding process is carried out in the adjacent drum (or drums) or furnace chamber and a pre-heating of the charge in the outmost drum or drums in the series. The electrical furnace is heated by means of rod shaped electrodes, introduced through the end walls of the furnace and maintained in contact with one another at their inner ends. The drum or drums for the preliminary reduction are not provided with any special heating means, but the preheating drum or chamber contains a device for combustion of gas, whereby heat is generated.

The electric furnace and the drums or furnace chambers suitably may be placed along a sloping axis for facilitating the movement of the charge through the chambers. In some cases it may be suitable to place the pre-heating drum (or drums) or chamber on a higher level than the other drums or chambers, thereby facilitating the attendance of the chamber or chambers first mentioned. It is also possible to arrange the different drums or chambers in another relation to one-another in which case the communications between them of course must be arranged correspondingly.

Some constructional forms of my furnace system are illustrated in the annexed drawings. Fig. I illustrates a longitudinal section of the general type of the system, suitable for the production of iron, Fig. II is a longitudinal section of a modified construction, Fig. III is a longitudinal section of a part of the system for the continuous production of iron sponge, Fig. IV is a longitudinal section of a form of the system adapted for the production of zinc, and Fig. V is a similar section of a further modification.

In the form shown at Fig. I, 1 is the rotating electric furnace, with the electrodes 2 and 3 for heating by means of short circuit. The furnace is provided with central openings surrounded by necks or collars 4, 5, the last mentioned of which is connected to a drum or chamber 6 for the preliminary reduction, while the wall 8 of this chamber is connected to the pre-heating drum or chamber 7. A blast tube 9 with a mouthpiece 10 for the introduction of air to support the combustion of gas opens in the last mentioned chamber 7. This chamber communicates at its outer end with a tube 14 by means of which the charge is introduced from the feeding device 16. The drum 7 also communicates with a chamber 12 provided with a tube 17 for removal of the products of combustion. The chamber surrounded by the neck or collar 4 communicates with a feeding device 15 for carbon by means of a tube 13.

At the treatment of iron ores for production of iron this system operates in the following manner.

The ore is introduced in the drum 7 without any addition of carbon and is pre-heated in the said drum from which it at the rotation of the system is fed into the preliminary reduction chamber 6, where it is reduced by means of carbon monoxide formed at the final reduction process in the electric furnace 1. The ore thus preliminary reduced passes through the collar or neck 5 into the furnace 1, where it is mixed with carbon, introduced through the neck 4; the reduction is completed in this part of the furnace system and the reduced iron is melted and drawn off with the slag at suitable intervals. The carbon monoxide required at the reduction in the preliminary reduction chamber 6 is formed at the process in the electric furnace 1. At the reduction in the chamber 6 so much heat is generated that it together with the heat carried with the gas from the electric furnace 1 will become sufficient for meeting the demand of heat in the chamber 6. The monoxide of carbon resting in the gas is combusted in the drum 7, from which the products of combustion are drawn off. If, however, the quantity of gas last mentioned is not sufficient for the pre-heating an additional quantity of fuel may be introduced for instance through the tube 18.

In the modified construction of this furnace system illustrated in longitudinal section in Fig. II, the pre-heating chamber 7 in this case is formed by a drum 21 placed not on the same axis as the furnace 1 and the preliminary reduction drum but on a higher level. This drum 21 communicates with the extended neck 5—which also contains the preliminary reduction chamber —by means of the stationary chamber 22, enclosing a suitable feeding device 23 by which the charge is brought from the pre-heating drum to the reduction chamber. A tube 26 for introduction of combustion air in the drum 21 traverses the chamber 22. The system is in its other parts arranged essentially as described with relation to Fig. 1, but in the chamber 11 there is placed a gas-feeding tube 27 provided with a damper and another tube 28 with damper is arranged between the chambers 22 and 11 for permitting the passage of gas between these two chambers. If desired carbon may be introduced in the reduction chamber, formed by the extended neck 5, by means of a feeding device 25 and a feeding tube 24.

The process carried out in this system corresponds to that described in connection to Fig. I.

In Fig. III which represents a longitudinal section of a part of the system adapted for the continuous production of iron sponge, the tube 13 for supply of carbon to the electric furnace 1 is extended by means of a preferably conical tube 19 extending through the neck 4, the interior of the electric furnace 1 and ending in the neck 5. The reduced iron sponge is continuously removed from the electric furnace 1 through the neck 4 which is open against the chamber 11, containing a lock device 20 through which the said sponge is taken out.

By suitably adjusting the addition of carbon the system now described and illustrated in Figs. I, II, III also may be used for the production of pig iron or steel with any desired percentage of carbon.

Fig. IV which illustrates in longitudinal section a modified form of the system adapted for the production of zinc, essentially corresponding to Fig. II but departing therefrom on account thereof that zinc adopts a gaseous state during the reduction process.

Thus any carbon is not introduced through the neck 4, for which reason the feeding device for the carbon is omitted and the neck in place thereof is connected to a condenser 38 which partakes in the movement of the system. This condenser is connected to the one end of a conduit 39, provided with an air-trap, the other end of said conduit extending in the tube 26 of the pre-heating drum 21. The neck 5 in this construction is closed against the chamber 22 and tightly and movably connected with a feeding screw or hopper 23 whereby the gas formed during the reduction is caused to pass away through the condenser.

The zinc is produced in this furnace system in the following manner. A mixture of a complex oxide zinc ore and carbon is introduced through the tube 14 into the pre-heating chamber 21, where the mixture is pre-heated by combustion of carbon monoxide and subjected to a preliminary reduction, whereby iron, lead, etc. are reduced. The charge thus treated enters the neck 5 and passes through it under a beginning reduction of the zinc to the furnace 1, where the zinc is completely reduced and transformed into a gaseous state. The accompanying other metals and rocky parts are collected in the furnace 1, and may be melted and drawn off or removed in a molten state through an opening in the furnace wall. The gaseous zinc is caught in the condenser and condensed into liquid zinc, which is drawn off. The carbon monoxide formed at the reaction in the electric furnace streams through the conduit 39 to the pre-heating chamber or drum 21, where it is utilized at the preheating and preliminary reduction process.

By the separation of the metals, usually accompanying the zinc, already in the pre-heating drum a formation of carbon dioxide in the reduction chamber is obviated, as also the pre-heating prevents the dissociation of the carbon monoxide and the formation of carbon dioxide resulting therefrom. Both these operations for these reasons prevent a re-oxydation of the zinc fumes and are thus of importance in the production of zinc.

The form shown in Fig. V illustrates a further modification of the furnace system now described, and is intended for the production of oxide of zinc from sulphuric zinc ores. The only essential difference from the construction illustrated in Fig. 1 consists therein that the mouth piece 10 is placed nearer to the electric furnace and that the neck 5 is extended in such a manner that it contains the two chambers 6 and 7. The neck 4 surrounds gas-tight the feed pipe for the introduction of carbon.

The sulphuric zinc ore is introduced in a finely divided state through the tube 14 and is continuously moved forwardly through the system against the electric furnace 1; during this movement it is pre-heated in the chamber 7 and burnt in the interior of the neck 5 by the blast introduced through the mouth piece 10, which (if desired) may be placed tangentially. The ore with the remaining oxides thereupon enters the electric furnace 1 where it is mixed with carbon and reduced. The zinc fumes and the carbon monoxide formed pass into the neck 5, where the zinc fumes are burnt to oxide of zinc. All such oxide produced during the process is carried away with the products of combustion through the tube 17 and utilized in any known manner.

Having now particularly described the nature of my invention and the manner of its operation, what I claim is:

1. Electrically heated furnace system especially for metallurgical and such processes, consisting of an electric drum-shaped furnace, movable on its axis and containing rod shaped electrodes introduced against one another through the end walls forming pairs of short circuited electrodes, the said furnace on its one end wall having a central opening communicating with a drum-shaped preliminary reduction chamber, which in its turn communicates with a pre-heating chamber, provided with means for producing a combustion therein and connected with a device for introduction of the charge, while the other end wall of the electric furnace is provided with a central opening, communicating with any suitable apparatus required by the process to be carried out in the system, the electric furnace and the other drums having the same axis.

2. Electrically heated furnace system especially for metallurgical and such processes, consisting of an electric drum-shaped furnace, moveable on its axis and containing rod shaped electrodes introduced against one another through the end walls, forming pairs of short circuited electrodes, the said furnace on its one end wall having a central opening communicating with a drum-shaped preliminary reduction chamber, which in its turn communicates with a pre-heating chamber, provided with means for producing a combustion therein and connected with a device for introduction of the charge, while the other end wall of the electric furnace is provided with a central opening, communicating with any suitable apparatus required by the process to be carried out in the system, the pre-heating drum being placed on a higher level than the electric furnace and the preliminary reduction drum, which have a common axis.

3. Electrically heated furnace system especially for metallurgical and such processes, consisting of an electric drum-shaped furnace, moveable on its axis and containing rod-shaped electrodes introduced against one another through the end walls, forming pairs of short circuited electrodes, the said furnace on its one end wall having a central opening communicating with a drum-shaped preliminary reduction chamber, which in its turn communicates with a stationary vertical pre-heating chamber, provided with means for producing a combustion therein and connected with a device for introduction of the charge, while the other end wall of the electric furnace is provided with a central opening communicating with any suitable apparatus required by the process to be carried out in the system.

In testimony whereof I affix my signature in presence of two witnesses.

ADAM HELMER PEHRSON.

Witnesses:
 H. TELANDER,
 A. SIMON.